United States Patent
Saber et al.

(10) Patent No.: US 11,601,946 B2
(45) Date of Patent: Mar. 7, 2023

(54) MULTI-TRP AND URLLC CAPABILITY SIGNALING

(71) Applicant: Samsung Electronics Co., Ltd., Suwon-si (KR)

(72) Inventors: Hamid Saber, San Diego, CA (US); Jung Hyun Bae, San Diego, CA (US); Jungmin Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/990,907

(22) Filed: Aug. 11, 2020

(65) Prior Publication Data

US 2021/0243751 A1 Aug. 5, 2021

Related U.S. Application Data

(60) Provisional application No. 62/970,636, filed on Feb. 5, 2020.

(51) Int. Cl.
*H04W 72/04* (2009.01)
*H04L 5/00* (2006.01)
*H04W 72/0453* (2023.01)

(52) U.S. Cl.
CPC ......... *H04W 72/048* (2013.01); *H04L 5/0032* (2013.01); *H04W 72/0413* (2013.01); *H04W 72/0453* (2013.01)

(58) Field of Classification Search
CPC ... H04L 5/0032; H04L 5/0035; H04W 72/048
See application file for complete search history.

(56) References Cited

U.S. PATENT DOCUMENTS

| | | | |
|---|---|---|---|
| 7,127,574 B2 | 10/2006 | Rotithor et al. | |
| 8,989,004 B2 | 3/2015 | Zhang et al. | |
| 9,584,407 B2 | 2/2017 | Martin et al. | |
| 10,470,191 B2 | 11/2019 | Si et al. | |
| 2016/0095104 A1 | 3/2016 | Chen et al. | |
| 2018/0019898 A1* | 1/2018 | Takahashi | H04W 72/048 |
| 2018/0184415 A1 | 6/2018 | Rong et al. | |
| 2020/0052817 A1 | 2/2020 | Kudekar et al. | |
| 2020/0084754 A1 | 3/2020 | Tsai et al. | |
| 2020/0275308 A1* | 8/2020 | Liu | H04L 1/1825 |

(Continued)

FOREIGN PATENT DOCUMENTS

| | | | | |
|---|---|---|---|---|
| WO | WO-2020146848 A1 * | 7/2020 | | H04L 5/0035 |
| WO | WO-2021022399 A1 * | 2/2021 | | H04L 1/1854 |

OTHER PUBLICATIONS

Unpublished U.S. Appl. No. 16/905,673, filed Jun. 18, 2020.

(Continued)

*Primary Examiner* — Kevin Kim
(74) *Attorney, Agent, or Firm* — Lewis Roca Rothgerber Christie LLP

(57) ABSTRACT

A system and method for capability signaling In some embodiments, the method includes sending, by a user equipment (UE), to a network, a first report, including a report of one or more capabilities selected from the group consisting of: reports of capabilities in support of multi-transmission and reception point (M-TRP) schemes, reports of capabilities in support of uRLLC service, and reports of capabilities in support of out of order (OoO) processing.

16 Claims, 2 Drawing Sheets

(56) References Cited

U.S. PATENT DOCUMENTS

2020/0322822 A1* 10/2020 Tsai ............... H04W 72/042
2020/0367241 A1* 11/2020 Hosseini ............. H04W 8/24

OTHER PUBLICATIONS

Qualcomm Incorporated: "Enhancements to Scheduling and HARQ for eURLLC," R1-1907284, 3rd Generation Partnership Project (3GPP), May 2019, 10 pages, Retrieved from the Internet: URL:http://www.3gpp.org/ftp/Meeting%5F3GPP%5FSYNC/RAN1/Docs/R1%2D1907284%2Ezip [retrieved on May 13, 2019].

Qualcomm Incorporated: "Multi-TRP Enhancements," R1-1907289, 3rd Generation Partnership Project (3GPP), May 2019, 25 pages, Retrieved from the Internet: URL:http://www.3gpp.org/ftp/Meetings%5F3GPP%5FSYNC/RAN1/Docs/ R1%2D1907289%2Ezip [retrieved on May 13, 2019].

Qualcomm Incorporated: "PDCCH Enhancements for eURLLC," R1-1907281, 3rd Generation Partnership Project (3GPP), May 2019, 11 pages, Retrieved from the Internet: URL:http://www.3gpp.org/ftp/Meetings%5F3GPP%5FSYNC/RAN1/Docs/ R1%2D1907281%2Ezip [retrieved on May 13, 2019].

Mediatek Inc.: "PDCCH enhancements for eURLLC," R1-1912116, 3rd Generation Partnership Project (3GPP), Nov. 2019, 10 pages, Retrieved from the Internet: URL:http://ftp.3gpp.org/tsg_ran/WG1_RL1/TSGR1_99/Docs/R1-1912116.zip [retrieved on Nov. 9, 2019].

CATT: "Discussion on out-of-order scheduling/HARQ," R1-1906330, 3rd Generation Partnership Project (3GPP), May 2019, 9 pages, Retrieved from the Internet: URL:http://www.3gpp.org/ftp/Meetings%5F3GPP%5FSYNC/RAN1/Docs/R1%2D1906330%2Ezip [retrieved on May 13, 2019].

Huawei, et al., "Enhancements to scheduling/HARQ," RI-1906060, 3rd Generation Partnership Project (3GPP), May 2019, 9 pages, Retrieved from the Internet: URL:http://www.3gpp.org/ftp/Meetings%5F3GPP%5FSYNC/RAN1/Docs/R1%2D1906060%2Ezip [retrieved on May 13, 2019].

Qualcomm Incorporated: "Summary of Enhancements to Scheduling/HARQ," RI-1905902, 3rd Generation Partnership Project (3GPP), Apr. 2019, 25 pages, Retrieved from the Internet: URL:http://www.3gpp.org/ftp/tsg%5Fran/WG1% 5FRL1/TSGR1%5F96b/Docs/R1%2D1905902%2Ezip [retrieved on Apr. 15, 2019].

Qualcomm Incorporated: "Summary #3 of Email discussion regarding the out-of-order HARQ issue," RI-1907925, 3rd Generation Partnership Project (3GPP), Apr. 2019, 10 pages, Retrieved from the Internet: URL:http://www.3gpp.org/ftp/tsg%5Fran/WG1% 5FRL1/TSGR1%5F97/Docs/R1%2D1907925%2Ezip [retrieved on May 20, 2019].

EPO Partial European search Report dated Nov. 20, 2020, issued in European Patent Application No. 20184240.8 (14 pages).

EPO Extended Search Report dated Mar. 23, 2021, issued in European Patent Application No. 20184240.8 (18 pages).

EPO Extended European Search Report dated May 3, 2021, issued in corresponding European Patent Application No. 20214188.3 (10 pages).

U.S. Restriction Requirement dated Dec. 20, 2022, issued in U.S. Appl. No. 16/905,673 (6 pages).

* cited by examiner

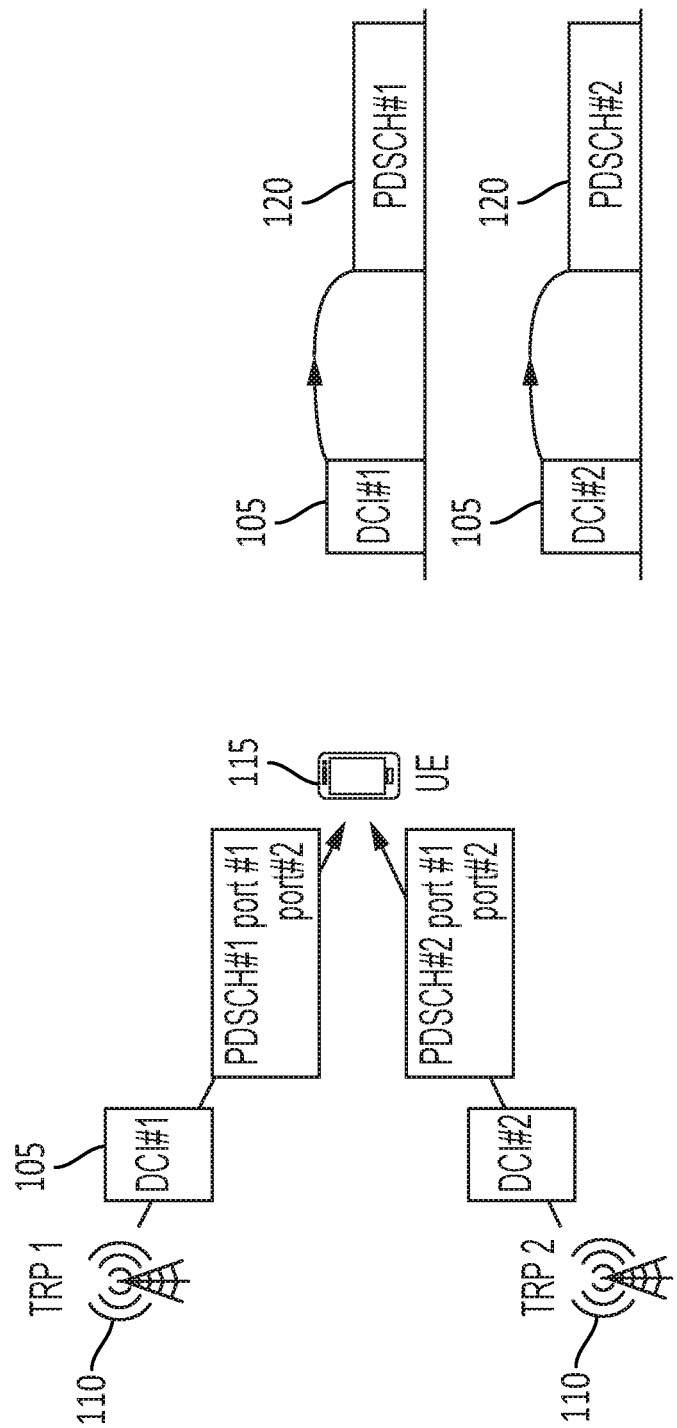

MULTI-TRP AND URLLC CAPABILITY SIGNALING

CROSS-REFERENCE TO RELATED APPLICATION(S)

The present application claims priority to and the benefit of U.S. Provisional Application No. 62/970,636, filed Feb. 5, 2020, entitled "SYSTEM AND METHOD FOR PROVIDING USER EQUIPMENT (UE) CAPABILITY SIGNALING ON SUPPORTING MULTI-TRANSMISSION AND RECEPTION POINT (M-TRP)", the entire content of which is incorporated herein by reference.

FIELD

One or more aspects of embodiments according to the present disclosure relate to wireless communications, and more particularly to a system and method for reporting capabilities, by a user equipment, to a network.

BACKGROUND

Various capabilities that a user equipment may have, such as multi-transmission and reception point operation, or various types of out of order operation may not be supported by some kinds of user equipment. As such, if a network were to assume that all of the user equipment with which it interacts supports such capabilities, it is possible that some of the communication links would fail, and if the network were to assume that none of the user equipment with which it interacts supports such capabilities, it is possible that some of the links would operate at performance levels inferior to those achievable. Thus, there is a need for a system and method for a network to be aware of the capabilities of the user equipment.

SUMMARY

According to an embodiment of the present invention, there is provided a method, including: sending, by a user equipment (UE), to a network, a first report, including a report of one or more capabilities selected from the group consisting of: reports of capabilities in support of multi-transmission and reception point (M-TRP) schemes, reports of capabilities in support of uRLLC service, and reports of capabilities in support of out of order (OoO) processing.

In some embodiments, the first report further includes an identification of a component carrier (CC), and the first report applies to the component carrier.

In some embodiments, the first report further includes an identification of a band, and the first report apples to component carriers (CCs) in the band.

In some embodiments, the first report further includes an identification of a combination of bands, and the first report apples to component carriers (CCs) in the combination of bands.

In some embodiments, the first report further includes: a first maximum number of CCs for which, at a first subcarrier spacing, the user equipment supports a first capability of the one or more capabilities, and a first fallback action code, the first fallback action code specifying the behavior of the UE when configured, at the first subcarrier spacing, with more than the first maximum number of CCs.

In some embodiments, the first fallback action code indicates that when the UE is configured, at the first subcarrier spacing, with more than the first maximum number of CCs, it will not support the first capability.

In some embodiments, the first fallback action code indicates that when the UE is configured, at the first subcarrier spacing, with more than the first maximum number of CCs, it will support the first capability on only one CC.

In some embodiments, the one CC is the CC having the lowest cell index or the CC having the highest cell index.

In some embodiments, the first fallback action code indicates that when the UE is configured, at the first subcarrier spacing, with more than the maximum number of CCs, it will support the first capability only on $\lfloor 2N_{cell,feature}^{\mu} - N_{Cell}^{\mu} \rfloor$ CCs, wherein $N_{cell,feature}^{\mu}$ is the first maximum number, and $N_{Cell}^{\mu}$ is the number of CCs with which the UE is configured, at the first subcarrier spacing.

In some embodiments: the first capability is multi-transmission and reception point (M-TRP) reception; and the first fallback action code indicates that when the UE is configured, at the first subcarrier spacing, with more than the maximum number of CCs, it will support the first capability only on $$\left\lfloor \frac{M \times N_{cell,feature}^{\mu} - N_{Cell}^{\mu}}{M-1} \right\rfloor CCs,$$

wherein M is the number of TRPs, $N_{cell,feature}^{\mu}$ is the first maximum number of CCs, and $N_{Cell}^{\mu}$ is the number of CCs with which the UE is configured, at the first subcarrier spacing.

In some embodiments: the first capability is out of order (OoO) reception; and the first fallback action code indicates that when the UE is configured, at the first subcarrier spacing, with more than the maximum number of CCs, it will support the first capability only on $$\left\lfloor \frac{M \times N_{cell,feature}^{\mu} - N_{Cell}^{\mu}}{M-1} \right\rfloor CCs,$$

wherein M is the maximum possible number of overlapping or OoO PDSCHs with different priorities, $N_{cell,feature}^{\mu}$ is the first maximum number of CCs, and $N_{Cell}^{\mu}$ is the number of CCs with which the UE is configured, at the first subcarrier spacing.

In some embodiments, the first report further includes: a second maximum number of CCs for which, at a second subcarrier spacing, the user equipment supports the first capability of the one or more capabilities, and a second fallback action code, the second fallback action code specifying the behavior of the UE when configured, at the second subcarrier spacing, with more than the second maximum number of CCs.

In some embodiments, the first report further includes: a third maximum number of CCs for which, at the first subcarrier spacing, the user equipment supports a second capability of the one or more capabilities, and a third fallback action code, the third fallback action code specifying the behavior of the UE when configured, at the first subcarrier spacing, with more than the third maximum number of CCs.

According to an embodiment of the present invention, there is provided a method including: receiving, by a network, from a user equipment (UE), a first report, including a report of one or more capabilities selected from the group consisting of: reports of capabilities in support of multi-transmission and reception point (M-TRP) schemes, reports of capabilities in support of uRLLC service, and reports of capabilities in support of out of order (OoO) processing; and responsive to receiving the first report, implementing a response protocol suitable for a UE having the one or more capabilities.

In some embodiments, the first report further includes an identification of a component carrier (CC), and the first report applies to the component carrier.

In some embodiments, the first report further includes an identification of a band, and the first report apples to component carriers (CCs) in the band.

In some embodiments, the first report further includes an identification of a combination of bands, and the first report apples to component carriers (CCs) in the combination of bands.

In some embodiments, the first report further includes: a first maximum number of CCs for which, at a first subcarrier spacing, the user equipment supports a first capability of the one or more capabilities, and a first fallback action code, the first fallback action code specifying the behavior of the UE when configured, at the first subcarrier spacing, with more than the first maximum number of CCs.

In some embodiments, the first fallback action code indicates that when the UE is configured, at the first subcarrier spacing, with more than the first maximum number of CCs, it will not support the first capability.

According to an embodiment of the present invention, there is provided a user equipment including: a processing circuit, the processing circuit being configured to sending, to a network, a first report, including a one or more of capabilities selected from the group consisting of: reports of capabilities in support of multi-transmission and reception point (M-TRP) schemes, reports of capabilities in support of uRLLC service, and reports of capabilities in support of out of order (OoO) processing.

BRIEF DESCRIPTION OF THE DRAWINGS

These and other features and advantages of the present disclosure will be appreciated and understood with reference to the specification, claims, and appended drawings wherein:

FIG. 2A is a network diagram, according to an embodiment of the present disclosure; and FIG. 2B is a timing diagram, according to an embodiment of the present disclosure.

DETAILED DESCRIPTION

The detailed description set forth below in connection with the appended drawings is intended as a description of exemplary embodiments of a system and method for multi-TRP and uRLLC capability signaling provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Multiple input multiple output (MIMO) transmission schemes may be used in digital communications to increase the capacity of a wireless channel. The 3GPP mobile communication standard supports MIMO transmission schemes in which a physical downlink shared channel (PDSCH) or a physical uplink shared channel (PUSCH), among other types of channels and signals, may be transmitted from different physical antennas or different antenna ports.

Different antenna ports of a MIMO transmission scheme may be from within a single transmission and reception point (TRP) in which case the scheme is referred to as a single TRP transmission scheme. Different antenna ports of one or different channels may also be within multiple TRPs which may be non-co-located, in which case the scheme is referred to as a Multi-TRP (M-TRP) scheme. An example of such a scenario is when a rank-2 PDSCH is transmitted by two antenna ports where the first port is within TRP1 and the second port is within TRP2.

M-TRP transmissions may be categorized into single downlink control information (single-DCI) and multi-DCI M-TRP. With single-DCI M-TRP, a single PDCCH is transmitted from one of the TRPs and it schedules one or multiple PDSCHs. In one transmission scheme different layers of a single PDSCH are transmitted from different TRPs. In other transmission schemes multiple PDSCHs (multiplexed in the time domain or in the frequency domain) with the same transport block (TB) are transmitted such that all the layers of a PDSCH are transmitted from one of the TRPs. Different PDSCHs among the multiple PDSCHs may be transmitted from different TRPs according to a pattern. With multi-DCI M-TRP, each TRP transmits its own PDCCH, which schedules a PDSCH which is also transmitted from the ports within the same TRP.

Figure 1B:
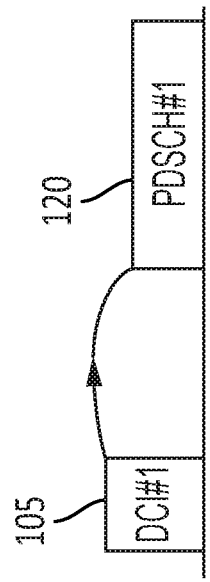
FIG. 1B is a timing diagram, according to an embodiment of the present disclosure.
Figure 1A:
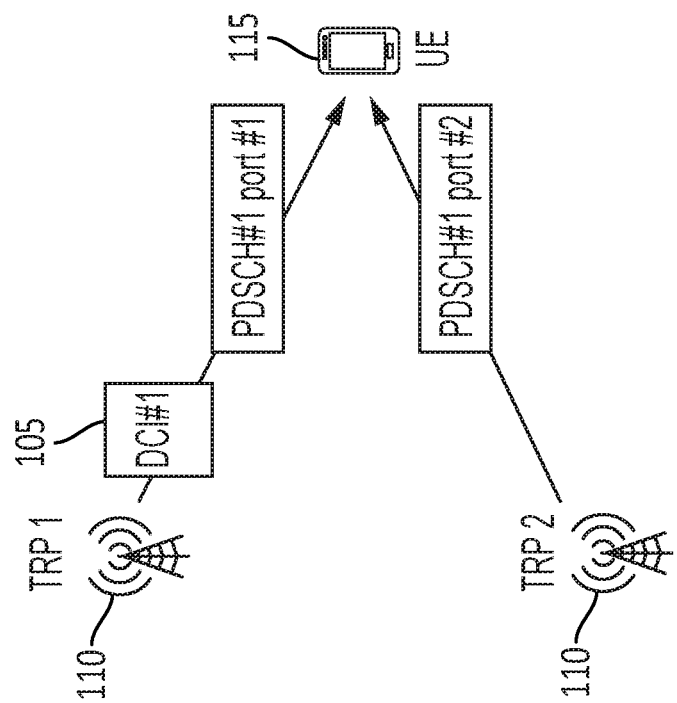
FIG. 1A is a network diagram, according to an embodiment of the present disclosure.

FIG. 1 shows an example of single-DCI M-TRP transmission. As may be seen in FIG. 1A, a single DCI (PDCCH) 105 is transmitted from a first TRP 110 (TRP1) to a user equipment (UE) 115, and schedules a PDSCH with two layers. Layer #1 is transmitted from antenna port #1 within TRP1 while layer #2 is transmitted from antenna port #2 within TRP2. FIG. 1B shows the sequence in time: the DCI 105 is transmitted first, followed by a PDSCH 120, PDSCH #1. As used herein, certain phrases, such as "user equipment" and "downlink control information" are used as countable nouns even though the nouns they contain (e.g., "equipment" and "information") may not be countable in ordinary English.

FIG. 2A shows an example of multi-DCI M-TRP transmission. As may be seen, each of the two TRPs transmits its own DCIs. Each DCI schedules one PDSCH with two-layer transmission. All of the layers of a given PDSCH are transmitted from the antenna ports within the same TRP. FIG. 2B shows the sequence in time: the DCIs 105 (DCI #1 and DCI #2) are transmitted first, followed by the PDSCHs 120 (PDSCH #1 and PDSCH #2).

For a release 16 (Rel-16) uRLLC (ultra-reliable and low-latency communication) UE and dynamic grant scheduling, the HARQ (hybrid automatic repeat request)-ACK (acknowledgement) associated with the second PDSCH with HARQ process ID x received after the first PDSCH with HARQ process ID y (x !=y) may be sent before the HARQ-ACK of the first PDSCH. This behavior may be referred to as out-of-order (OoO) HARQ, and may be beneficial if uRLLC traffic is to be provided to a UE while less-urgent eMBB (enhanced mobile broadband) traffic is also ongoing. In the above example, the first PDSCH may be for eMBB, and the second PDSCH may be for uRLLC. In the 3GPP specification, the eMBB latency requirement is referred to as UE PDSCH processing capability #1 (cap #1), and the uRLLC latency requirement is referred to as UE PDSCH processing capability #2 (cap #2).

In some embodiments, a UE may report its capabilities in one of several contexts. In a first context, the UE may report its capability to perform certain features (i.e., support certain capabilities) in any scenario. In this case, it may be said that the UE reports its capability on a per-UE basis. In a second context, the UE may report its capability to perform certain features in particular bands. In this case, it may be said that the UE reports its capability on a per-band basis. In a third context, the UE may report its capability to perform certain features in particular band combinations for carrier aggregation (CA). In this case, it may be said that the UE reports its capability on a per-band combination or per-BC basis. In a fourth context, the UE may report its capability to perform certain features in one or more specific bands in a particular band combination for carrier aggregation (CA). In this case, a mechanism referred to as feature sets may be used to allow for such flexibility in reporting, and it may be said that the UE reports its capability on a per-feature-set or per-FS basis. In a fifth context, the UE may report its capability to perform certain features in one or more specific component carriers (CCs) in a particular band combination for CA. In this case, a mechanism referred to as feature sets per component carrier (CC) may be used to allow for such flexibility in reporting, and it may be said that the UE reports its capability on a per-feature set per CC or per-FSPC basis in that case.

As used herein, a "band combination" is a collection of bands to represent a CA configuration as described in the 3GPP specification (version 38.101). From the first context to the last context listed above, the UE's flexibility for reporting support of certain features increases. For example, if feature A and feature B are per-FSPC, a UE may have the flexibility to support only one of feature A and B in each CC. However, if the UE reports that those features are per-UE, then the UE has reported that it will support (or not support) those features for all CCs. As such, a trade-off may be made, between added flexibility and signaling overhead.

Benefits of UE capability signaling (or "capability reporting") may be understood from the following considerations. In Rel-15 both single-DCI and multi-DCI transmissions are supported in a specification-transparent way. That is, from the UE perspective it does not matter whether the different layers of the scheduled PDSCH are coming from different TRPs or the same TRP, as the UE does not recognize the existence of multiple TRPs. Furthermore, in the case of multi-DCI M-TRP, if the scheduled PDSCHs are within the same serving cell (or "component carrier", or "CC", or simply "cell"), the UE does not expect the multiple scheduled PDSCHs to overlap in the time domain, nor in the frequency domain. Furthermore, for uRLLC service types, transmission schemes to provide low latency and high reliability are supported in Rel-15.

In Rel-16, specification efforts have been made to enhance M-TRP transmission. In particular, multi-DCI M-TRP transmission may be allowed to be supported with overlapping PDSCHs from different TRPs. For example, as illustrated in FIG. 2B, the two PDSCHs may overlap in the time domain or in the frequency domain. The capability to support out of order operation is also beneficial for a single TRP and uRLLC service type in which a higher priority may be assigned to the uRLLC service than to the eMBB service. In one framework, the network (gNB) may schedule an eMBB PDSCH and then, due to arrival of uRLLC traffic, may schedule uRLLC PDSCH immediately after the eMBB PDSCH, resulting in a collision in the time domain, i.e. overlapping PDSCHs. This behavior may be referred to as OoO PDCCH-to-PDSCH, suitably defined in TR 38.824. Furthermore, the network may ask for the ACK-NACK (A/N) of a later PDSCH (having high priority) to be transmitted before that of an earlier PDSCH (having low priority). This behavior may be referred to as OoO HARQ. OoO operations aim to provide reduced latency for uRLLC applications. In general, since M-TRP operation and overlapping or OoO operations may increase the UE processing burden, supporting them may be considered as a UE capability, and capability signaling methods may be employed to communicate these capabilities to the network.

In some embodiments, methods are implemented for UE capability signaling to support M-TRP or uRLLC OoO operations which include (i) processing of two overlapping PDSCHs from two TRPs and (ii) OoO PDSCHs from two TRPs, or from one TRP, as in a uRLLC use case. In some embodiments, the UE capability may be defined and reported as feature set per cell (FSPC): the UE reports a capability to support M-TRP or uRLLC feature per each serving cell in a band or band combination. An example of a syntax for such UE capability signaling is shown in Listing 1 and Listing 2, below.

Listing 1

```
FeatureSetDownlinkPerCC ::= SEQUENCE{
    ...
    M-TRP_Reception_supported        ENUMERATED {supported, not-supported}
    uRLLC_feature_supported          ENUMERATED {supported, not-supported}
    OoO_feature_supported            ENUMERATED {supported, not-supported}
    ...
}
```

Listing 2

```
FeatureSetUplinkPerCC ::= SEQUENCE {
    ...
    M-TRP_Transmission_supported     ENUMERATED {supported, not-supported}
    uRLLC_feature_supported          ENUMERATED {supported, not-supported}
    OoO_feature_supported            ENUMERATED {supported, not-supported}
    ...
}
```

In Listing 1 and Listing 2, M-TRP_Transmission supported, uRLLC_feature_supported and OoO_feature_supported indicate whether the UE supports features related to M-TRP, uRLLC or out-of-order operation, respectively.

In some embodiments, the capabilities are reported with finer granularity. For example, the UE may report whether or not it supports sub-features of M-TRP or whether or not it supports sub-features of uRLLC on a particular serving cell. The sub-features may include, for example, (i) support for multiple-DCI M-TRP, (ii) support for an increased PDCCH blind decoding (BD) and control channel element (CCE) (BD/CCE) limit, (iii) support for out-of-order (OoO) PDCCH to PDSCH operation, (iv) support for OoO PDCCH to PUSCH operation, and (v) support for OoO PDSCH to HARQ operation. An example of a syntax for such UE capability signaling is shown in Listing 3, below.

Listing 3

```
FeatureSetDownlinkPerCC ::= SEQUENCE {
    ...
    Single-DCI-M-TRP_Transmission_supported    ENUMERATED
{supported, not-supported}
    Multi-DCI-M-TRP_Transmission_supported    ENUMERATED
{supported, not-supported}
    Increased BD_CCE limit_supported           ENUMERATED
{supported, not-supported}
    OoO_PDCCH_to_PDSCH_supported               ENUMERATED
{supported, not-supported}
    OoO_PDCCH_to_PUSCH_supported               ENUMERATED
{supported, not-supported}
    OoO_PDSCH_to_HARQ_supported                ENUMERATED
{supported, not-supported}
    ...
}
```

The OoO operations mentioned in Listing 3 are defined in Rel-15, TS 38.214. The increased BD-CCE limit may be a per slot increase or an advanced PDCCH monitoring capability such as span-based PDCCH monitoring (introduced in Rel-16 NR).

In another example of capabilities being reported with finer granularity, the UE may report whether or not it supports processing of overlapping PDSCHs each from a different TRP on the serving cell or processing of overlapping PDSCHS with different service types from a single TRP. An example of a syntax for such UE capability signaling is shown in Listing 4, below.

Listing 4

```
FeatureSetDownlinkPerCC ::= SEQUENCE {
    ...
    Processing_M-TRP-Overlapping_PDSCHs_supported
    ENUMERATED {supported, not-supported}
    Processing_single-TRP-Overlapping_PDSCHs_supported
    ENUMERATED {supported, not-supported}
    ...
}
```

The UE capability signaling methods described herein may be employed with an arbitrary number of TRPs. For instance, in case of four TRPs, the UE may report to the network (the gNB) whether the UE supports processing of up to four overlapping PDSCHs, each transmitted from one TRP. Furthermore, in case of $N_{priority} > 2$ service types with $N_{priority}$ priority levels, the UE may report the capability to process $N_{priority}$ overlapping PDSCHs.

Reporting the UE capability per serving cell via FSPC, as described above, may result in relatively high signaling overhead. Accordingly, in some embodiments, to reduce the signaling overhead, the UE reports its capability as a feature set (FS) with possible restrictions at the serving cell level. Some such embodiments include supporting the feature while taking into account the subcarrier spacing (SCS) of the serving cells as well as including a fallback action.

In some embodiments, the UE capability is defined as a feature set; for example, the UE reports a capability to support M-TRP or uRLLC features for the serving cells of a frequency band. Examples of a syntax for such UE capability signaling are shown in Listing 5, below.

Listing 5

```
FeatureSetDownlink ::= SEQUENCE {
    ...
    Multi-DCI_M-TRP_Reception    SEQUENCE {
    SCS-15 kHz    Sequence {
        Fallback         ENUMERATED {action#1, action#2, action#3}
        NumberOfCarriers INTEGER (1..Max_Carriers)
    }
    SCS-30 kHz Sequence {
        Fallback         ENUMERATED {action#1, action#2, action#3}
        NumberOfCarriers INTEGER (1..Max_Carriers)
    }
    SCS-60 kHz Sequence {
        Fallback         ENUMERATED {action#1, action#2, action#3}
        NumberOfCarriers INTEGER (1..Max_Carriers)
    }
    SCS-120 kHz Sequence {
        Fallback         ENUMERATED {action#1, action#2, action#3}
        NumberOfCarriers INTEGER (1..Max_Carriers)
    }
    }
    Single-DCI_M-TRP_Reception SEQUENCE {
    SCS-15 kHz Sequence {
        Fallback         ENUMERATED {action#1, action#2, action#3}
        NumberOfCarriers INTEGER (1..Max_Carriers)
    }
    SCS-30 kHz Sequence {
        Fallback         ENUMERATED {action#1, action#2, action#3}
        NumberOfCarriers INTEGER (1..Max_Carriers)
    }
    SCS-60 kHz Sequence {
        Fallback         ENUMERATED {action#1, action#2, action#3}
        NumberOfCarriers INTEGER (1..Max_Carriers)
    }
    SCS-120 kHz Sequence {
        Fallback         ENUMERATED {action#1, action#2, action#3}
        NumberOfCarriers INTEGER (1..Max_Carriers)
    }
    }
    Increased BD_CCE limitSEQUENCE {
    SCS-15 kHz Sequence {
```

```
        Fallback         ENUMERATED {action#1, action#2, action#3}
        NumberOfCarriers INTEGER (1..Max_Carriers)
      }
      SCS-30 kHz Sequence {
        Fallback         ENUMERATED {action#1, action#2, action#3}
        NumberOfCarriers INTEGER (1..Max_Carriers)
      }
      SCS-60 kHz Sequence {
        Fallback         ENUMERATED {action#1, action#2, action#3}
        NumberOfCarriers INTEGER (1..Max_Carriers)
      }
      SCS-120 kHz Sequence {
        Fallback         ENUMERATED {action#1, action#2, action#3}
        NumberOfCarriers INTEGER (1..Max_Carriers)
      }
    }
    OoO_PDCCH_to_PDSCH SEQUENCE {
      SCS-15 kHz Sequence {
        Fallback         ENUMERATED {action#1, action#2, action#3}
        NumberOfCarriers INTEGER (1..Max_Carriers)
      }
      SCS-30 kHz Sequence {
        Fallback         ENUMERATED {action#1, action#2, action#3}
        NumberOfCarriers INTEGER (1..Max_Carriers)
      }
      SCS-60 kHz Sequence {
        Fallback         ENUMERATED {action#1, action#2, action#3}
        NumberOfCarriers INTEGER (1..Max_Carriers)
      }
    } SCS-120 kHz Sequence {
        Fallback         ENUMERATED {action#1, action#2, action#3}
        NumberOfCarriers INTEGER (1..Max_Carriers)
      }
    }
    OoO_ PDCCH_to_PUSCH SEQUENCE {
      SCS-15 kHz Sequence {
        Fallback         ENUMERATED {action#1, action#2, action#3}
        NumberOfCarriers INTEGER (1..Max_Carriers)
      }
      SCS-30 kHz Sequence {
        Fallback         ENUMERATED {action#1, action#2, action#3}
        NumberOfCarriers INTEGER (1..Max_Carriers)
      }
      SCS-60 kHz Sequence {
        Fallback         ENUMERATED {action#1, action#2, action#3}
        NumberOfCarriers INTEGER (1..Max_Carriers)
      }
      SCS-120 kHz Sequence {
        Fallback         ENUMERATED {action#1, action#2, action#3}
        NumberOfCarriers INTEGER (1..Max_Carriers)
      }
    }
    OoO_PDCCH_to_HARQ SEQUENCE {
      SCS-15 kHz Sequence {
        Fallback         ENUMERATED {action#1, action#2, action#3}
        NumberOfCarriers INTEGER (1..Max_Carriers)
      }
      SCS-30 kHz Sequence {
        Fallback         ENUMERATED {action#1, action#2, action#3}
        NumberOfCarriers INTEGER (1..Max_Carriers)
      }
      SCS-60 kHz Sequence {
        Fallback         ENUMERATED {action#1, action#2, action#3}
        NumberOfCarriers INTEGER (1..Max_Carriers)
      }
      SCS-120 kHz Sequence {
        Fallback         ENUMERATED {action#1, action#2, action#3}
        NumberOfCarriers INTEGER (1..Max_Carriers)
      }
    }
  ...
}
```

In Listing 5, Max_Carriers is the maximum number of serving cells which can be configured for a UE. In the examples below, a value of 16 is assumed for this quantity.

In some embodiments, the UE may report support parameters for each subcarrier spacing (SCS), e.g., the UE may report, for each of a plurality of numerologies, the number of serving cells on which it can support the M-TRP or uRLLC feature for the numerology. The UE may also report a fallback action (which may be represented by a fallback action code, in the report of UE capabilities sent to the network by the UE). If the number of configured serving cells, $N_{Cell}^{\mu}$, having an active bandwidth part with the associated subcarrier spacing (SCS) of numerology (a number that may be referred to as "the number of CCs with which the UE is configured, at the first subcarrier spacing") is larger than the UE-reported value, $N_{cell,feature}^{\mu}$, ($N_{Cell}^{\mu} > N_{cell,feature}^{\mu}$) the UE takes a fallback action. For example, one of three fallback actions may be reported. A first fallback action (which may be referred to as "action #1") may be that the UE does not support the feature on any of the configured cells. A second fallback action (which may be referred to as "action #2") may be that the UE only supports the feature on one serving cell, e.g., the serving cell with the lowest or highest cell index (each CC may have a unique, numerical index).

A third fallback action (which may be referred to as "action #3", and which may use the action code "action #3") may be that the UE only supports the feature on $\lfloor 2N_{cell,feature}^{\mu} - N_{Cell}^{\mu} \rfloor$ serving cells with the lowest or highest cell indices.

A fourth fallback action (which may be referred to as "action #4", and which may use the action code "action #3"), if the feature is M-TRP reception and the number of TRPs is M, may be that the UE only supports the M-TRP feature on $$\left\lfloor \frac{M \times N_{cell,feature}^{\mu} - N_{Cell}^{\mu}}{M - 1} \right\rfloor$$

serving cells with the lowest/highest cell indices. A fifth fallback action (which may be referred to as "action #5", and which may use the action code "action #3"), if the feature is OoO reception and the maximum possible number of overlapping or OoO PDSCHs with different priorities is M, may be that the UE only supports the feature on $$\left\lfloor \frac{M \times N_{cell,feature}^{\mu} - N_{Cell}^{\mu}}{M - 1} \right\rfloor$$

serving cells with the lowest/highest cell indices.

Several examples of such reporting follow.

Example 1

Suppose the UE reports the capability signaling as shown in Listing 6, below.

Listing 6

```
SCS-15 kHz              Sequence {
 Fallback                Fallback action#1
 NumberOfCarriers 4
}
```

This indicates that the UE can support one or more M-TRP features on up to $N_{Cell,TRP}^{\mu=0}=4$ serving cells with SCS=15 kHz and the fallback action is action #1.

If the UE is configured with $N_{Cell}^{\mu=0}=4$ or fewer serving cells with SCS=15 kHz, the UE will support the one or more M-TRP features on all of these serving cells.

If the UE is configured with $N_{Cell}^{\mu=0}=5$ or more serving cells with SCS=15 kHz, according to the fallback action #1, the UE will only support single-TRP operation on these serving cells.

Example 2

Suppose the UE reports the capability signaling as shown in Listing 7, below.

Listing 7

```
SCS-15 kHz              Sequence {
 Fallback                Fallback action#2
 NumberOfCarriers 4
}
```

This indicates that the UE can support one or more M-TRP features on up to $N_{Cell,TRP}^{\mu=0}=4$ serving cells with SCS=15 kHz and the fall back action is action #2.

If the UE is configured with $N_{Cell}^{\mu=0}=4$ or fewer serving cells with SCS=15 kHz, the UE will support the one or more M-TRP features on all of these serving cells.

If the UE is configured with $N_{Cell}^{\mu=0}=5$ or more serving cells with SCS=15 KHz, the UE will only support the one or more M-TRP features on the serving cell with lowest or highest index.

Example 3

Suppose the UE reports the capability signaling as shown in Listing 8, below.

Listing 8

```
SCS-15 kHz              Sequence {
 Fallback                Fallback action#3
 NumberOfCarriers 4
}
```

This indicates that the UE can support one or more M-TRP features on up to $N_{Cell,TRP}^{\mu=0}=4$ serving cells with SCS=15 kHz and the fallback action code is action #3.

If the UE is configured with $N_{Cell}^{\mu=0}=4$ or fewer serving cells with SCS=15 kHz, the UE will support M-TRP feature on all of these serving cells.

If the UE is configured with $N_{Cell}^{\mu=0}=5$ or more serving cells with SCS=15 kHz, the UE will only support the one or more M-TRP features on the $\lfloor 2 \times 4 - N_{Cell}^{\mu} \rfloor$ serving cells with lowest or highest indices if the number of TRPs is 2.

Example 4

Suppose the UE reports the capability signaling as shown in Listing 9, below, with the corresponding feature being OoO PDCCH_to_PDSCH or overlapping PDSCHs.

Listing 9

```
SCS-15 kHz              Sequence {
 Fallback                Fallback action#1
 NumberOfCarriers 4
}
```

This indicates that the UE can support processing of overlapping PDSCHs on up $N_{Cell,feature}^{\mu=0}=4$ serving cells with SCS=15 kHz and the fallback action is action #1.

If the UE is configured with $N_{Cell}^{\mu=0}=4$ or fewer serving cells with SCS=15 kHz, the UE will support processing of overlapping PDSCHs on all of these serving cells.

If the UE is configured with $N_{Cell}^{\mu=0}=5$ or more serving cells with SCS=15 kHz, according to the fallback action #1, the UE will not support processing of overlapping PDSCHs on these serving cells.

Example 5

Suppose the UE reports the capability signaling as shown in Listing 10, below, with the corresponding feature being OoO PDCCH_to_PDSCH or overlapping PDSCHs.
Listing 10

| | |
|---|---|
| SCS-15 kHz | Sequence { |
| Fallback | Fallback action#2 |
| NumberOfCarriers 4 | |
| } | |

This indicates that the UE can support processing of overlapping PDSCHs on up to $N_{Cell,feature}^{\mu=0}=4$ serving cells with SCS=15 kHz and the fallback action is action #2.

If the UE is configured with $N_{Cell}^{\mu=0}=4$ or fewer serving cells with SCS=15 kHz, the UE will support processing of overlapping PDSCHs on all of these serving cells.

If the UE is configured with $N_{Cell}^{\mu=0}=5$ or more serving cells with SCS=15 kHz, the UE will only support processing of overlapping PDSCHs on the serving cell with lowest or highest index.

Example 6

Suppose the UE reports the capability signaling as shown in Listing 11, below, with the corresponding feature being OoO PDCCH_to_PDSCH or overlapping PDSCHs.
Listing 11

| | |
|---|---|
| SCS-15 kHz | Sequence { |
| Fallback | Fallback action#3 |
| NumberOfCarriers 4 | |
| } | |

This indicates that the UE can support processing of overlapping PDSCHs on up to $N_{Cell,feature}^{\mu=0}=4$ serving cells with SCS=15 kHz and the fallback action is action #3.

If the UE is configured with $N_{Cell}^{\mu=0}=4$ or fewer serving cells with SCS=15 kHz, the UE will support processing of overlapping PDSCHs on all of these serving cells.

If the UE is configured with $N_{Cell}^{\mu=0}=5$ or more serving cells with SCS=15 kHz, the UE will only support processing of overlapping PDSCHs on the $\lfloor 2 \times 4 - N_{Cell}^{\mu} \rfloor$ serving cells with lowest or highest indices if the number of TRPs is 2.

In some embodiments, methods described herein may be performed by a processing circuit of the UE, or by a processing circuit of the network or both. For example, the processing circuit of the UE may send (via a radio in the UE), to a network, a report of capabilities, according to one or more embodiments described herein. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the term "rectangle" includes a square as a special case, i.e., a square is an example of a rectangle, and the term "rectangular" encompasses the adjective "square". As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for multi-TRP and uRLLC capability signaling have been specifically described and illustrated herein, many modifications and variations will be apparent to those skilled in the art. Accordingly, it is to be understood that a system and method for multi-TRP and uRLLC capability signaling constructed according to principles of this disclosure may be embodied other than as specifically described herein. The invention is also defined in the following claims, and equivalents thereof.

What is claimed is:

1. A method, comprising:
    sending, by a user equipment (UE), to a network, a first report, comprising a report of one or more capabilities,
    wherein the first report further comprises an identification of a component carrier (CC), and the first report reports the UE's capability to perform processing of two overlapping Physical Downlink Shared Channels (PDSCHs) from two Transmission and Reception Points (TRPs)
    wherein the first report further comprises:
    a first maximum number of CCs for which, at a first subcarrier spacing, the user equipment supports a first capability of the one or more capabilities, and
    a first fallback action code, the first fallback action code specifying the behavior of the UE when configured, at the first subcarrier spacing, with more than the first maximum number of CCs.

2. The method of claim 1, further comprising sending, by the user equipment (UE), to a network, a second report, comprising a report of one or more capabilities, wherein the second report further comprises an identification of a band, and the second report applies to component carriers (CCs) in the band.

3. The method of claim 1, further comprising sending, by the user equipment (UE), to a network, a second report, comprising a report of one or more capabilities, wherein the second report further comprises an identification of a combination of bands, and the second report applies to component carriers (CCs) in the combination of bands.

4. The method of claim 1, wherein the first fallback action code indicates that when the UE is configured, at the first subcarrier spacing, with more than the first maximum number of CCs, it will not support the first capability.

5. The method of claim 1, wherein the first fallback action code indicates that when the UE is configured, at the first subcarrier spacing, with more than the first maximum number of CCs, it will support the first capability on only one CC.

6. The method of claim 5, wherein the one CC is the CC having the lowest cell index or the CC having the highest cell index.

7. The method of claim 1, wherein the first fallback action code indicates that when the UE is configured, at the first subcarrier spacing, with more than the maximum number of CCs, it will support the first capability only on $\lfloor 2N_{cell,feature}^{\mu} - N_{Cell}^{\mu} \rfloor$ CCs, wherein $N_{cell,feature}^{\mu}$ is the first maximum number, and $N_{Cell}^{\mu}$ is the number of CCs with which the UE is configured, at the first subcarrier spacing.

8. The method of claim 1, wherein:
    the first capability is multi-transmission and reception point (M-TRP) reception; and
    the first fallback action code indicates that when the UE is configured, at the first subcarrier spacing, with more than the maximum number of CCs, it will support the first capability only on $$\left\lfloor \frac{M \times N_{cell,feature}^{\mu} - N_{Cell}^{\mu}}{M-1} \right\rfloor$$

CCs, wherein M is the number of TRPs, $N_{cell,feature}^{\mu}$ is the first maximum number of CCs, and $N_{cell}^{\mu}$ is the number of CCs with which the UE is configured, at the first subcarrier spacing.

9. The method of claim 1, wherein:
    the first capability is out of order (OoO) reception; and
    the first fallback action code indicates that when the UE is configured, at the first subcarrier spacing, with more than the maximum number of CCs, it will support the first capability only on $$\left\lfloor \frac{M \times N_{cell,feature}^{\mu} - N_{Cell}^{\mu}}{M-1} \right\rfloor$$

CCs, wherein M is the maximum possible number of overlapping or OoO PDSCHs with different priorities, $N_{cell,feature}^{\mu}$ is the first maximum number of CCs, and $N_{Cell}^{\mu}$ is the number of CCs with which the UE is configured, at the first subcarrier spacing.

10. The method of claim 1, wherein the first report further comprises:
    a second maximum number of CCs for which, at a second subcarrier spacing, the user equipment supports the first capability of the one or more capabilities, and
    a second fallback action code, the second fallback action code specifying the behavior of the UE when configured, at the second subcarrier spacing, with more than the second maximum number of CCs.

11. The method of claim 10, wherein the first report further comprises:
    a third maximum number of CCs for which, at the first subcarrier spacing, the user equipment supports a second capability of the one or more capabilities, and a third fallback action code, the third fallback action code specifying the behavior of the UE when configured, at the first subcarrier spacing, with more than the third maximum number of CCs.

12. A method comprising:

receiving, by a network, from a user equipment (UE), a first report, comprising a report of one or more capabilities; and responsive to receiving the first report, implementing a response protocol suitable for a UE having the one or more capabilities, wherein the first report further comprises an identification of a component carrier (CC), and the first report reports the UE's capability to perform processing of two overlapping Physical Downlink Shared Channels (PDSCHs) from two Transmission and Reception Points (TRPs), wherein the first report further comprises:

a first maximum number of CCs for which, at a first subcarrier spacing, the user equipment supports a first capability of the one or more capabilities, and a first fallback action code, the first fallback action code specifying the behavior of the UE when configured, at the first subcarrier spacing, with more than the first maximum number of CCs.

13. The method of claim 12, further comprising receiving, by the network, from a user equipment (UE), a second report, comprising a report of one or more capabilities, wherein the second report further comprises an identification of a band, and the second report applies to component carriers (CCs) in the band.

14. The method of claim 12, further comprising receiving, by the network, from a user equipment (UE), a second report, comprising a report of one or more capabilities, wherein the second report further comprises an identification of a combination of bands, and the second report applies to component carriers (CCs) in the combination of bands.

15. The method of claim 12, wherein the first fallback action code indicates that when the UE is configured, at the first subcarrier spacing, with more than the first maximum number of CCs, it will not support the first capability.

16. A user equipment comprising:

a processing circuit, the processing circuit being configured to send, to a network, a first report, comprising a report of one or more of capabilities, wherein the first report further comprises an identification of a component carrier (CC) specific combination of bands, and the first report reports the UE's capability to perform processing, of two overlapping Physical Downlink Shared Channels (PDSCHs) from two Transmission and Reception Points (TRPs), wherein the first report further comprises:

a first maximum number of CCs for which, at a first subcarrier spacing, the user equipment supports a first capability of the one or more capabilities, and a first fallback action code, the first fallback action code specifying the behavior of the UE when configured, at the first subcarrier spacing, with more than the first maximum number of CCs.

* * * * *